(12) United States Patent
Hotelling et al.

(10) Patent No.: US 10,871,850 B2
(45) Date of Patent: Dec. 22, 2020

(54) SIMULTANEOUS SENSING ARRANGEMENT

(71) Applicant: Apple Inc., Cupertino, CA (US)

(72) Inventors: Steven P. Hotelling, Los Gatos, CA (US); John Greer Elias, Townsend, DE (US); Kapil Vinod Sakariya, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 15/380,747

(22) Filed: Dec. 15, 2016

(65) Prior Publication Data

US 2017/0097728 A1    Apr. 6, 2017

Related U.S. Application Data

(60) Continuation of application No. 14/482,979, filed on Sep. 10, 2014, now Pat. No. 9,552,115, which is a
(Continued)

(51) Int. Cl.
*G06F 3/041* (2006.01)
*G06F 3/044* (2006.01)
(Continued)

(52) U.S. Cl.
CPC .......... *G06F 3/0416* (2013.01); *G06F 1/3262* (2013.01); *G06F 1/3265* (2013.01);
(Continued)

(58) Field of Classification Search
CPC ......... G06F 3/044–0448; G06F 3/0416–04186
(Continued)

(56) References Cited

U.S. PATENT DOCUMENTS 3,342,935 A    9/1967 Leifer et al.
3,732,369 A    5/1973 Cotter
(Continued)

FOREIGN PATENT DOCUMENTS

CN    1175315 A    3/1998
CN    1254902 A    5/2000
(Continued)

OTHER PUBLICATIONS

Notice of Allowance dated Dec. 14, 2016, for U.S. Appl. No. 12/208,329, filed Sep. 10, 2008, seven pages.
(Continued)

*Primary Examiner* — Patrick F Marinelli
(74) *Attorney, Agent, or Firm* — Kubota & Basol LLP

(57) ABSTRACT

Multi-touch touch-sensing devices and methods are described herein. The touch sensing devices can include multiple sense points, each located at a crossing of a drive line and a sense line. In some embodiments, multiple drive lines may be simultaneously or nearly simultaneously stimulated with drive signals having unique characteristics, such as phase or frequency. A sense signal can occur on each sense line that can be related to the drive signals by an amount of touch present at sense points corresponding to the stimulated drive lines and the sense line. By using processing techniques based on the unique drive signals, an amount of touch corresponding to each sense point can be extracted from the sense signal. The touch sensing methods and devices can be incorporated into interfaces for a variety of electronic devices such as a desktop, tablet, notebook, and handheld computers, personal digital assistants, media players, and mobile telephones.

17 Claims, 7 Drawing Sheets

Related U.S. Application Data continuation of application No. 14/019,264, filed on Sep. 5, 2013, now Pat. No. 8,928,617, which is a continuation of application No. 12/874,184, filed on Sep. 1, 2010, now Pat. No. 8,552,998, which is a division of application No. 11/619,433, filed on Jan. 3, 2007, now Pat. No. 7,812,827.

(51) Int. Cl.
  *G06F 1/3234* (2019.01)
  *G06F 3/047* (2006.01)

(52) U.S. Cl.
  CPC .............. *G06F 3/044* (2013.01); *G06F 3/047* (2013.01); *G06F 2203/04101* (2013.01); *G06F 2203/04104* (2013.01)

(58) Field of Classification Search
  USPC ............ 345/156–184, 104; 178/18.01–20.04
  See application file for complete search history.

(56) References Cited

U.S. PATENT DOCUMENTS

| | | | |
|---|---|---|---|
| 3,767,858 A | 10/1973 | Rodgers | |
| 3,818,133 A | 6/1974 | Cotter | |
| 3,875,472 A | 4/1975 | Schermerhorn | |
| 3,886,539 A | 5/1975 | Gould, Jr. | |
| 4,071,691 A | 1/1978 | Pepper, Jr. | |
| 4,080,515 A | 3/1978 | Anderson | |
| 4,103,252 A | 7/1978 | Bobick | |
| 4,129,747 A | 12/1978 | Pepper, Jr. | |
| 4,293,734 A | 10/1981 | Pepper, Jr. | |
| 4,444,998 A | 4/1984 | House | |
| 4,550,221 A | 10/1985 | Mabusth | |
| 4,560,830 A | 12/1985 | Perl | |
| 4,680,429 A | 7/1987 | Murdock et al. | |
| 4,698,460 A | 10/1987 | Krein et al. | |
| 4,698,461 A | 10/1987 | Meadows et al. | |
| 4,733,222 A | 3/1988 | Evans | |
| 4,853,498 A | 8/1989 | Meadows et al. | |
| 4,916,308 A | 4/1990 | Meadows | |
| 4,922,061 A | 5/1990 | Meadows et al. | |
| 5,105,186 A | 4/1992 | May | |
| 5,218,174 A | 6/1993 | Gray et al. | |
| 5,270,711 A | 12/1993 | Knapp | |
| 5,305,017 A | 4/1994 | Gerpheide | |
| 5,355,149 A | 10/1994 | Casebolt | |
| 5,357,266 A | 10/1994 | Tagawa | |
| 5,475,711 A | 12/1995 | Betts et al. | |
| 5,483,261 A | 1/1996 | Yasutake | |
| 5,488,204 A | 1/1996 | Mead et al. | |
| 5,495,077 A | 2/1996 | Miller et al. | |
| 5,526,294 A | 6/1996 | Ono et al. | |
| 5,543,590 A | 8/1996 | Gillespie et al. | |
| 5,565,658 A | 10/1996 | Gerpheide et al. | |
| 5,606,346 A | 2/1997 | Kai | |
| 5,621,425 A | 4/1997 | Hoshino et al. | |
| 5,634,207 A | 5/1997 | Yamaji et al. | |
| 5,650,597 A | 7/1997 | Redmayne | |
| 5,650,801 A | 7/1997 | Higashi | |
| 5,686,705 A | 11/1997 | Conroy et al. | |
| 5,691,512 A | 11/1997 | Obi | |
| 5,766,463 A | 6/1998 | Janik et al. | |
| 5,790,106 A | 8/1998 | Hirano et al. | |
| 5,790,107 A | 8/1998 | Kasser et al. | |
| 5,816,225 A | 10/1998 | Koch et al. | |
| 5,825,352 A | 10/1998 | Bisset et al. | |
| 5,831,600 A | 11/1998 | Inoue et al. | |
| 5,835,079 A | 11/1998 | Shieh | |
| 5,838,308 A | 11/1998 | Knapp et al. | |
| 5,861,583 A | 1/1999 | Schediwy et al. | |
| 5,880,411 A | 3/1999 | Gillespie et al. | |
| 5,920,309 A | 7/1999 | Bisset et al. | |
| 5,930,309 A | 7/1999 | Knutson et al. | |
| 5,945,980 A | 8/1999 | Moissev et al. | |
| 5,996,082 A | 11/1999 | Cortopassi | |
| 6,025,726 A | 2/2000 | Gershenfeld | |
| 6,043,810 A | 3/2000 | Kim et al. | |
| 6,057,903 A | 5/2000 | Colgan et al. | |
| 6,075,520 A | 6/2000 | Inoue et al. | |
| 6,177,918 B1 | 1/2001 | Colgan et al. | |
| 6,188,391 B1 | 2/2001 | Seely et al. | |
| 6,204,897 B1 | 3/2001 | Colgan et al. | |
| 6,222,528 B1 | 4/2001 | Gerpheide | |
| 6,229,856 B1 | 5/2001 | Diab et al. | |
| 6,246,729 B1 | 6/2001 | Richardson | |
| 6,310,610 B1 | 10/2001 | Beaton et al. | |
| 6,323,846 B1 | 11/2001 | Westerman et al. | |
| 6,327,011 B2 | 12/2001 | Kim | |
| 6,380,931 B1 | 4/2002 | Gillespie et al. | |
| 6,424,094 B1 | 7/2002 | Feldman | |
| 6,429,857 B1 | 8/2002 | Masters et al. | |
| 6,452,514 B1 | 9/2002 | Philipp | |
| 6,483,498 B1 | 11/2002 | Colgan et al. | |
| 6,492,979 B1 | 12/2002 | Kent et al. | |
| 6,501,529 B1 | 12/2002 | Kurihara et al. | |
| 6,559,658 B1 | 5/2003 | Brandt | |
| 6,583,676 B2 | 6/2003 | Krah et al. | |
| 6,621,484 B1 | 9/2003 | Yee | |
| 6,658,245 B2 | 12/2003 | Li et al. | |
| 6,667,740 B2 | 12/2003 | Ely et al. | |
| 6,680,448 B2 | 1/2004 | Kawashima et al. | |
| 6,690,387 B2 | 2/2004 | Zimmerman et al. | |
| 6,730,863 B1 | 5/2004 | Gerpheide et al. | |
| 6,816,750 B1 | 11/2004 | Klass | |
| 7,015,894 B2 | 3/2006 | Morohoshi | |
| 7,030,782 B2 | 4/2006 | Ely et al. | |
| 7,031,886 B1 | 4/2006 | Hargreaves | |
| 7,042,444 B2 | 5/2006 | Cok | |
| 7,050,046 B1 | 5/2006 | Park et al. | |
| 7,129,714 B2 | 10/2006 | Baxter | |
| 7,129,935 B2 | 10/2006 | Mackey | |
| 7,129,939 B2 | 10/2006 | Toyozawa et al. | |
| 7,133,032 B2 | 11/2006 | Cok | |
| 7,184,064 B2 | 2/2007 | Zimmerman et al. | |
| 7,202,856 B2 | 4/2007 | Cok | |
| 7,230,608 B2 | 6/2007 | Cok | |
| 7,230,609 B2 | 6/2007 | Chao et al. | |
| 7,248,625 B2 | 7/2007 | Chien | |
| 7,277,087 B2 | 10/2007 | Hill et al. | |
| 7,280,167 B2 | 10/2007 | Choi et al. | |
| 7,289,142 B2 | 10/2007 | Silverbrook | |
| 7,339,499 B2 | 3/2008 | Khlat | |
| 7,362,313 B2 | 4/2008 | Geaghan et al. | |
| 7,372,455 B2 | 5/2008 | Perski et al. | |
| 7,379,054 B2 | 5/2008 | Lee | |
| 7,436,393 B2 | 10/2008 | Hong et al. | |
| 7,643,011 B2 | 1/2010 | O'Connor et al. | |
| 7,649,524 B2 | 1/2010 | Haim et al. | |
| 7,663,607 B2 | 2/2010 | Hotelling et al. | |
| 7,734,261 B2 | 6/2010 | Bury | |
| 7,812,827 B2 * | 10/2010 | Hotelling .............. G06F 3/0416 |
| | | | 345/156 |
| 7,859,522 B2 | 12/2010 | Takahashi et al. | |
| 7,876,311 B2 | 1/2011 | Krah et al. | |
| 7,986,193 B2 | 7/2011 | Krah | |
| 8,026,904 B2 | 9/2011 | Westerman | |
| 8,120,591 B2 | 2/2012 | Krah et al. | |
| 8,144,125 B2 | 3/2012 | Peng | |
| 8,144,126 B2 | 3/2012 | Wright | |
| 8,175,549 B2 | 5/2012 | Faust et al. | |
| 8,232,970 B2 | 7/2012 | Krah et al. | |
| 8,237,667 B2 | 8/2012 | Krah | |
| 8,479,122 B2 | 7/2013 | Hotelling et al. | |
| 8,493,331 B2 | 7/2013 | Krah et al. | |
| 8,508,244 B2 | 8/2013 | Seguine | |
| 8,514,185 B2 | 8/2013 | Hotelling | |
| 8,552,998 B2 * | 10/2013 | Hotelling .............. G06F 3/0416 |
| | | | 345/156 |
| 8,592,697 B2 | 11/2013 | Hotelling et al. | |
| 8,593,423 B2 | 11/2013 | Hotelling et al. | |
| 8,659,556 B2 | 2/2014 | Wilson | |
| 8,659,568 B2 | 2/2014 | Krah et al. | |

(56) References Cited

U.S. PATENT DOCUMENTS

| | | |
|---|---|---|
| 8,754,867 B2 | 6/2014 | Krah et al. |
| 8,791,920 B2 | 7/2014 | Krah |
| 8,928,617 B2 * | 1/2015 | Hotelling .............. G06F 3/0416 345/156 |
| 8,976,124 B1 | 3/2015 | Wright |
| 8,988,390 B1 | 3/2015 | Krah et al. |
| 9,036,650 B2 | 5/2015 | Wilson et al. |
| 9,069,408 B2 | 6/2015 | Hotelling et al. |
| 9,086,750 B2 | 7/2015 | Krah |
| 9,092,086 B2 | 7/2015 | Krah et al. |
| 9,348,451 B2 | 5/2016 | Wilson et al. |
| 9,430,087 B2 | 8/2016 | Krah et al. |
| 9,483,141 B2 | 11/2016 | Hotelling et al. |
| 9,552,115 B2 * | 1/2017 | Hotelling .............. G06F 3/0416 |
| 9,606,663 B2 | 3/2017 | Yousefpor et al. |
| 9,715,306 B2 | 7/2017 | Hotelling et al. |
| 9,990,084 B2 | 6/2018 | Krah et al. |
| 10,042,396 B1 | 8/2018 | Gupta et al. |
| 10,042,472 B2 | 8/2018 | Hotelling et al. |
| 10,042,476 B2 | 8/2018 | Wilson et al. |
| 10,139,890 B2 | 11/2018 | Wilson et al. |
| 2002/0015024 A1 | 2/2002 | Westerman et al. |
| 2002/0067348 A1 | 6/2002 | Masters et al. |
| 2002/0067845 A1 | 6/2002 | Griffis |
| 2002/0084992 A1 | 7/2002 | Agnew |
| 2002/0136269 A1 | 9/2002 | Kurabe et al. |
| 2002/0140689 A1 | 10/2002 | Huang et al. |
| 2002/0167488 A1 | 11/2002 | Hinckley et al. |
| 2002/0196066 A1 | 12/2002 | Krah et al. |
| 2003/0025676 A1 | 2/2003 | Cappendijk |
| 2003/0048261 A1 | 3/2003 | Yamamoto et al. |
| 2003/0063073 A1 | 4/2003 | Geaghan et al. |
| 2003/0067447 A1 | 4/2003 | Geaghan et al. |
| 2003/0132922 A1 | 7/2003 | Philipp |
| 2003/0197691 A1 | 10/2003 | Fujiwara et al. |
| 2004/0056845 A1 | 3/2004 | Harkcom et al. |
| 2004/0081339 A1 | 4/2004 | Benkley, III |
| 2004/0109097 A1 | 6/2004 | Mai |
| 2004/0141096 A1 | 7/2004 | Mai |
| 2004/0151235 A1 | 8/2004 | Olson et al. |
| 2004/0183787 A1 | 9/2004 | Geaghan et al. |
| 2004/0183833 A1 | 9/2004 | Chua |
| 2004/0189587 A1 | 9/2004 | Jung et al. |
| 2004/0227743 A1 | 11/2004 | Brown |
| 2005/0052427 A1 | 3/2005 | Wu et al. |
| 2005/0052582 A1 | 3/2005 | Mai |
| 2005/0094038 A1 | 5/2005 | Choi et al. |
| 2005/0104867 A1 | 5/2005 | Westerman et al. |
| 2005/0146512 A1 | 7/2005 | Hill et al. |
| 2005/0146513 A1 | 7/2005 | Hill et al. |
| 2005/0151727 A1 | 7/2005 | Kwong |
| 2005/0231487 A1 | 10/2005 | Ming |
| 2005/0243023 A1 | 11/2005 | Reddy et al. |
| 2006/0007165 A1 | 1/2006 | Yang et al. |
| 2006/0022955 A1 | 2/2006 | Kennedy |
| 2006/0022959 A1 | 2/2006 | Geaghan |
| 2006/0026521 A1 | 2/2006 | Hotelling et al. |
| 2006/0097991 A1 | 5/2006 | Hotelling et al. |
| 2006/0114247 A1 | 6/2006 | Brown |
| 2006/0114650 A1 | 6/2006 | Wang et al. |
| 2006/0132462 A1 | 6/2006 | Geaghan |
| 2006/0145365 A1 | 7/2006 | Halls et al. |
| 2006/0146033 A1 | 7/2006 | Chen et al. |
| 2006/0146034 A1 | 7/2006 | Chen et al. |
| 2006/0161870 A1 | 7/2006 | Hotelling et al. |
| 2006/0197750 A1 | 9/2006 | Kerr et al. |
| 2006/0197753 A1 | 9/2006 | Hotelling |
| 2006/0244733 A1 | 11/2006 | Geaghan |
| 2006/0244736 A1 | 11/2006 | Tseng |
| 2006/0279548 A1 | 12/2006 | Geaghan |
| 2006/0284856 A1 | 12/2006 | Soss |
| 2007/0018969 A1 | 1/2007 | Chen et al. |
| 2007/0062739 A1 | 3/2007 | Philipp et al. |
| 2007/0075977 A1 | 4/2007 | Chen et al. |
| 2007/0109274 A1 | 5/2007 | Reynolds |
| 2007/0176905 A1 | 8/2007 | Shih et al. |
| 2007/0216657 A1 | 9/2007 | Konicek |
| 2007/0229468 A1 | 10/2007 | Peng et al. |
| 2007/0257890 A1 | 11/2007 | Hotelling et al. |
| 2007/0262967 A1 | 11/2007 | Rho |
| 2007/0268272 A1 | 11/2007 | Perski et al. |
| 2007/0273663 A1 | 11/2007 | Park et al. |
| 2007/0274411 A1 | 11/2007 | Lee et al. |
| 2008/0006453 A1 | 1/2008 | Hotelling |
| 2008/0012835 A1 | 1/2008 | Rimon et al. |
| 2008/0018618 A1 | 1/2008 | Hill et al. |
| 2008/0042964 A1 | 2/2008 | Sako et al. |
| 2008/0048989 A1 | 2/2008 | Yoon et al. |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0062147 A1 | 3/2008 | Hotelling et al. |
| 2008/0067528 A1 | 3/2008 | Choi et al. |
| 2008/0074401 A1 | 3/2008 | Chung et al. |
| 2008/0079697 A1 | 4/2008 | Lee et al. |
| 2008/0088594 A1 | 4/2008 | Liu et al. |
| 2008/0129898 A1 | 6/2008 | Moon |
| 2008/0136980 A1 | 6/2008 | Rho et al. |
| 2008/0143683 A1 | 6/2008 | Hotelling |
| 2008/0150901 A1 | 6/2008 | Lowles et al. |
| 2008/0156546 A1 | 7/2008 | Hauck |
| 2008/0157867 A1 | 7/2008 | Krah |
| 2008/0157882 A1 | 7/2008 | Krah |
| 2008/0157893 A1 | 7/2008 | Krah |
| 2008/0158167 A1 | 7/2008 | Hotelling et al. |
| 2008/0158169 A1 | 7/2008 | O'Connor et al. |
| 2008/0158172 A1 | 7/2008 | Hotelling et al. |
| 2008/0158175 A1 | 7/2008 | Hotelling et al. |
| 2008/0158180 A1 | 7/2008 | Krah et al. |
| 2008/0158184 A1 | 7/2008 | Land et al. |
| 2008/0162996 A1 | 7/2008 | Krah et al. |
| 2008/0162997 A1 | 7/2008 | Vu et al. |
| 2008/0165203 A1 | 7/2008 | Pantfoerder |
| 2008/0278143 A1 | 11/2008 | Cox et al. |
| 2008/0309625 A1 | 12/2008 | Krah et al. |
| 2008/0309628 A1 | 12/2008 | Krah et al. |
| 2009/0009483 A1 | 1/2009 | Hotelling et al. |
| 2009/0189867 A1 | 7/2009 | Krah et al. |
| 2009/0278479 A1 | 11/2009 | Platner et al. |
| 2009/0283340 A1 | 11/2009 | Liu et al. |
| 2009/0314621 A1 | 12/2009 | Hotelling |
| 2009/0315840 A1 | 12/2009 | Park et al. |
| 2010/0059295 A1 | 3/2010 | Hotelling et al. |
| 2010/0060589 A1 | 3/2010 | Wilson |
| 2010/0060590 A1 | 3/2010 | Wilson et al. |
| 2010/0060591 A1 | 3/2010 | Krah |
| 2010/0060593 A1 | 3/2010 | Krah |
| 2010/0060608 A1 | 3/2010 | Yousefpor |
| 2010/0214232 A1 | 8/2010 | Chan et al. |
| 2010/0328265 A1 | 12/2010 | Hotelling et al. |
| 2011/0025634 A1 | 2/2011 | Krah et al. |
| 2011/0042152 A1 | 2/2011 | Wu |
| 2011/0063993 A1 | 3/2011 | Wilson et al. |
| 2011/0084857 A1 | 4/2011 | Marino et al. |
| 2012/0019467 A1 | 1/2012 | Hotelling et al. |
| 2012/0044194 A1 | 2/2012 | Peng et al. |
| 2012/0280932 A1 | 11/2012 | Krah et al. |
| 2012/0299880 A1 | 11/2012 | Krah |
| 2013/0271410 A1 | 10/2013 | Westerman et al. |
| 2014/0022203 A1 | 1/2014 | Karpin et al. |
| 2014/0043293 A1 | 2/2014 | Hotelling et al. |
| 2014/0092063 A1 | 4/2014 | Krah |
| 2014/0168143 A1 | 6/2014 | Hotelling et al. |
| 2014/0240287 A1 | 8/2014 | Krah et al. |
| 2014/0306913 A1 | 10/2014 | Krah |
| 2014/0375612 A1 | 12/2014 | Hotelling et al. |
| 2015/0234535 A1 | 8/2015 | Hotelling et al. |
| 2015/0261285 A1 | 9/2015 | Wilson et al. |
| 2015/0301681 A1 | 10/2015 | Krah et al. |
| 2016/0266718 A1 | 9/2016 | Wilson et al. |
| 2016/0364078 A1 | 12/2016 | Krah et al. |
| 2017/0010744 A1 | 1/2017 | Hotelling et al. |

(56) References Cited

U.S. PATENT DOCUMENTS

| | | | |
|---|---|---|---|
| 2017/0322669 A1 | 11/2017 | Hotelling et al. |
| 2018/0275820 A1 | 9/2018 | Krah et al. |
| 2018/0348957 A1 | 12/2018 | Wilson et al. |

FOREIGN PATENT DOCUMENTS

| | | |
|---|---|---|
| CN | 1773442 A | 5/2006 |
| CN | 1914585 A | 2/2007 |
| EP | 0 818 751 A1 | 1/1998 |
| EP | 1 387 242 A2 | 2/2004 |
| EP | 1 387 242 A3 | 2/2004 |
| EP | 2 453 341 A1 | 5/2012 |
| GB | 1 440 130 A | 6/1976 |
| GB | 2 451 973 A | 2/2009 |
| GB | 2 451 973 B | 2/2009 |
| JP | 2000-163031 A | 6/2000 |
| JP | 2002-342033 A | 11/2002 |
| KR | 1998-0010726 A | 4/1998 |
| WO | WO-96/18179 A1 | 6/1996 |
| WO | WO-98/02964 A1 | 1/1998 |
| WO | WO-98/07127 A1 | 2/1998 |
| WO | WO-2004/099964 A2 | 11/2004 |
| WO | WO-2004/099964 A3 | 11/2004 |
| WO | WO-2008/010917 A1 | 1/2008 |
| WO | WO-2008/085416 A1 | 7/2008 |
| WO | WO-2008/085457 A2 | 7/2008 |
| WO | WO-2008/085457 A3 | 7/2008 |
| WO | WO-2008/085719 A2 | 7/2008 |
| WO | 2008157252 A1 | 12/2008 |
| WO | WO-2008/157245 A2 | 12/2008 |
| WO | WO-2010/030706 A1 | 3/2010 |
| WO | WO-2010/030709 A1 | 3/2010 |

OTHER PUBLICATIONS

Notice of Allowance dated Apr. 6, 2017, for U.S. Appl. No. 15/270,950, filed Sep. 20, 2016, seven pages.
Final Office Action dated Jun. 1, 2017, for U.S. Appl. No. 15/158,461, filed May 18, 2016, 17 pages.
Chinese Search Report dated Nov. 24, 2011, for CN Application No. ZL2008201335089, with English Translation, nine pages.
European Search Report dated Apr. 17, 2012, for EP Patent Application No. 11188985.3, six pages.
European Search Report dated Oct. 4, 2016, for EP Patent Application No. 16178444.2, four pages.
Fakatselis, J. (Aug. 1996). "Processing Gain for Direct Sequence Spread Spectrum Communication Systems and PRISM®," Application Note AN9633, *Intersil*, four pages.
Final Office Action dated Feb. 1, 2011, for U.S. Appl. No. 11/818,345, filed Jun. 13, 2007, 20 pages.
Final Office Action dated Sep. 1, 2011, for U.S. Appl. No. 12/874,184, filed Sep. 1, 2010, 19 pages.
Final Office Action dated Aug. 17, 2012, for U.S. Appl. No. 13/250,984, filed Sep. 30, 2011, 14 pages.
Final Office Action dated Aug. 28, 2012, for U.S. Appl. No. 12/283,423, filed Sep. 10, 2008, nine pages.
Final Office Action dated Oct. 12, 2012, for U.S. Appl. No. 12/208,315, filed Sep. 10, 2008, 21 pages.
Final Office Action dated Dec. 5, 2013, for U.S. Appl. No. 12/208,315, filed Sep. 10, 2008, 22 pages.
Final Office Action dated Dec. 30, 2013, for U.S. Appl. No. 12/208,329, filed Sep. 10, 2008, 12 pages.
Final Office Action dated Oct. 7, 2014, for U.S. Appl. No. 12/208,315, filed Sep. 10, 2008, 28 pages.
Final Office Action dated Feb. 26, 2015, for U.S. Appl. No. 12/208,329, filed Sep. 10, 2008, 13 pages.
Final Office Action dated Dec. 24, 2015, for U.S. Appl. No. 12/208,315, filed Sep. 10, 2008, 28 pages.
Final Office Action dated Feb. 4, 2016, for U.S. Appl. No. 14/482,979, filed Sep. 10, 2014, 12 pages.

International Search Report dated Apr. 6, 2009, for PCT Application No. PCT/US2007/088750, filed Dec. 21, 2007, six pages.
International Search Report dated Oct. 30, 2009, for PCT Application No. PCT/US2008/066743, filed Jun. 12, 2008, six pages.
International Search Report dated Dec. 21, 2009, for PCT Application No. PCT/US2009/056413, filed Sep. 9, 2009, three pages.
International Search Report dated Dec. 22, 2009, for PCT Application No. PCT/US2009/056410, filed Sep. 9, 2009, three pages.
Kanda, E. et al. (2008). "55.2: Integrated Active Matrix Capacitive Sensors for Touch Panel LTPS-TFT LCDs," *SID 08 Digest*, pp. 834-837.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Nov. 4, 2009, for U.S. Appl. No. 11/619,433, filed Jan. 3, 2007, 33 pages.
Non-Final Office Action dated May 12, 2010, for U.S. Appl. No. 11/818,345, filed Jun. 13, 2007, 27 pages.
Non-Final Office Action dated Jun. 8, 2010, for U.S. Appl. No. 11/650,046, filed Jan. 3, 2007, 11 pages.
Non-Final Office Action dated Nov. 22, 2010, for U.S. Appl. No. 11/650,046, filed Jan. 3, 2007, 10 pages.
Non-Final Office Action dated Apr. 27, 2011, for U.S. Appl. No. 12/874,184, filed Sep. 1, 2010, 18 pages.
Non-Final Office Action dated May 20, 2011, for U.S. Appl. No. 12/283,435, filed Sep. 10, 2008, six pages.
Non-Final Office Action dated Sep. 8, 2011, for U.S. Appl. No. 12/208,334, filed Sep. 10, 2008, 16 pages.
Non-Final Office Action dated Nov. 7, 2011, for U.S. Appl. No. 13/250,984, filed Sep. 30, 2011, nine pages.
Non-Final Office Action dated Nov. 17, 2011, for U.S. Appl. No. 12/283,423, filed Sep. 10, 2008, nine pages.
Non-Final Office Action dated Nov. 25, 2011, for U.S. Appl. No. 12/208,329, filed Sep. 10, 2008, 31 pages.
Non-Final Office Action dated Dec. 19, 2011, for U.S. Appl. No. 12/208,315, filed Sep. 10, 2008, 21 pages.
Non-Final Office Action dated Apr. 13, 2012, for U.S. Appl. No. 13/250,984, filed Sep. 30, 2011, 14 pages.
Non-Final Office Action dated May 2, 2012, for U.S. Appl. No. 12/874,184, filed Sep. 1, 2010, 20 pages.
Non-Final Office Action dated Sep. 28, 2012, for U.S. Appl. No. 12/208,329, filed Sep. 10, 2008, 33 pages.
Non-Final Office Action dated Oct. 5, 2012, for U.S. Appl. No. 13/568,027, filed Aug. 6, 2012, six pages.
Non-Final Office Action dated Oct. 25, 2012, for U.S. Appl. No. 12/874,184, filed Sep. 1, 2010, 23 pages.
Non-Final Office Action dated Dec. 7, 2012, for U.S. Appl. No. 13/250,984, filed Sep. 30, 2011, 10 pages.
Non-Final Office Action dated Apr. 23, 2013, for U.S. Appl. No. 13/568,027, filed Aug. 6, 2012, 8 pages.
Non-Final Office Action dated Apr. 25, 2013, for U.S. Appl. No. 13/553,421, filed Jul. 19, 2012, 10 pages.
Non-Final Office Action dated Apr. 30, 2013, for U.S. Appl. No. 12/208,315, filed Sep. 10, 2008, 21 pages.
Non-Final Office Action dated Aug. 23, 2013, for U.S. Appl. No. 13/916,357, filed Jun. 12, 2013, 17 pages.
Non-Final Office Action dated Aug. 29, 2013, for U.S. Appl. No. 12/208,329, filed Sep. 10, 2008, 13 pages.
Non-Final Office Action dated Mar. 14, 2014, for U.S. Appl. No. 12/208,315, filed Sep. 10, 2008, 25 pages.
Non-Final Office Action dated May 13, 2014, for U.S. Appl. No. 14/056,841, filed Oct. 17, 2013, seven pages.
Non-Final Office Action dated Jun. 6, 2014, for U.S. Appl. No. 12/208,329, filed Sep. 10, 2008, 12 pages.
Non-Final Office Action dated Sep. 29, 2014, for U.S. Appl. No. 14/315,162, filed Jun. 25, 2014, seven pages.
Non-Final Office Action dated May 14, 2015, for U.S. Appl. No. 12/208,315, filed Sep. 10, 2008, 25 pages.
Non-Final Office Action dated Jul. 29, 2015, for U.S. Appl. No. 14/482,979, filed Sep. 10, 2014, 19 pages.
Non-Final Office Action dated Dec. 14, 2015, for U.S. Appl. No. 12/208,329, filed Sep. 10, 2008, 14 pages.

(56) References Cited

OTHER PUBLICATIONS

Non-Final Office Action dated Aug. 8, 2016, for U.S. Appl. No. 15/158,461, filed May 18, 2016, 15 pages.
Non-Final Office Action dated Oct. 28, 2016, for U.S. Appl. No. 15/270,950, filed Sep. 20, 2016, six pages.
Notice of Allowance dated Jun. 7, 2010, for U.S. Appl. No. 11/619,433, filed Jan. 3, 2007, 10 pages.
Notice of Allowance dated Mar. 28, 2012, for U.S. Appl. No. 11/650,046, filed Jan. 3, 2007, seven pages.
Notice of Allowance dated Apr. 5, 2012, for U.S. Appl. No. 12/283,435, filed Sep. 10, 2008, seven pages.
Notice of Allowance dated Mar. 21, 2013, for U.S. Appl. No. 12/208,329, filed Sep. 10, 2008, 14 pages.
Notice of Allowance dated Apr. 8, 2013, for U.S. Appl. No. 11/818,345, filed Jun. 13, 2007, 14 pages.
Notice of Allowance dated May 23, 2013, for U.S. Appl. No. 13/250,984, filed Sep. 30, 2011, 10 pages.
Notice of Allowance dated Jun. 4, 2013, for U.S. Appl. No. 12/874,184, filed Sep. 1, 2010, 12 pages.
Notice of Allowance dated Aug. 23, 2013, for U.S. Appl. No. 13/250,984, filed Sep. 30, 2011, 10 pages.
Notice of Allowance dated Aug. 29, 2013, for U.S. Appl. No. 12/283,423, filed Sep. 10, 2008, eight pages.
Notice of Allowance dated Sep. 27, 2013, for U.S. Appl. No. 13/553,421, filed Jul. 19, 2012, 8 pages.
Notice of Allowance dated Nov. 25, 2013, for U.S. Appl. No. 13/568,027, filed Aug. 6, 2012, nine pages.
Notice of Allowance dated Feb. 6, 2014, for U.S. Appl. No. 13/916,357, filed Jun. 12, 2013, 25 pages.
Notice of Allowance dated Mar. 11, 2014, for U.S. Appl. No. 13/568,027, filed Aug. 6, 2012, eight pages.
Notice of Allowance dated Jun. 13, 2014, for U.S. Appl. No. 14/019,264, filed Sep. 5, 2013, 13 pages.
Notice of Allowance dated Dec. 3, 2014, for U.S. Appl. No. 13/935,333, filed Jul. 3, 2013, nine pages.
Notice of Allowance dated Jan. 15, 2015, for U.S. Appl. No. 14/056,841, filed Oct. 17, 2013, ten pages.
Notice of Allowance (corrected) dated Mar. 19, 2015, for U.S. Appl. No. 14/056,841, filed Oct. 17, 2013, seven pages. (Supplemental).
Notice of Allowance dated Mar. 25, 2015, for U.S. Appl. No. 14/270,147, filed May 5, 2014, nine pages.
Notice of Allowance dated May 18, 2015, for U.S. Appl. No. 14/315,162, filed Jun. 25, 2014, eight pages.
Notice of Allowance dated Mar. 14, 2016, for U.S. Appl. No. 12/208,315, filed Sep. 10, 2008, 12 pages.
Notice of Allowance dated May 11, 2016, for U.S. Appl. No. 14/791,145, filed Jul. 2, 2015, 17 pages.
Notice of Allowance dated Jul. 15, 2016, for U.S. Appl. No. 14/704,885, filed May 5, 2015, seven pages.
Notice of Allowance dated Aug. 29, 2016, for U.S. Appl. No. 14/482,979, filed Sep. 10, 2014, 15 pages.
Notice of Allowance dated Sep. 14, 2016, for U.S. Appl. No. 12/208,329, filed Sep. 10, 2008, seven pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Oct. 15, 2008, for GB Patent Application No. 0808783.5, filed May 15, 2008, two pages.
Search Report dated Apr. 24, 2009, for NL Application No. 2001666, English translation, 12 pages.
Search Report dated May 25, 2015, for ROC (Taiwan) Patent Application No. 102100040, with English translation, two pages.
Taiwanese Search Report dated Aug. 16, 2012, for TW Patent Application No. 097100216, two pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Wikipedia, Online-Encyclopedia. (Jun. 6, 2007). "Phase (waves)," retrieved on Jan. 18, 2016, located at: http://en.wikipedia.org/w/index.php?title=phase_(wave)$oldid=136332745, two pages.
Wikipedia, Online-Encyclopedia. (Jun. 11, 2007). "Signal generator," retrieved on Jan. 13, 2016, located at: http://en.wikipedia.org/w/index.php?title=signal_generator$oldid=137433567, two pages.
Notice of Allowance dated May 22, 2018, for U.S. Appl. No. 15/158,461, filed May 18, 2016, nine pages.
Notice of Allowance dated May 31, 2018, for U.S. Appl. No. 15/658,314, filed Jul. 24, 2017, seven pages.
Notice of Allowance dated Apr. 10, 2018, for U.S. Appl. No. 15/250,736, filed Aug. 29, 2016, nine pages.
Advisory Action received for U.S. Appl. No. 12/208,315, dated Feb. 26, 2014, 3 pages.
Advisory Action received for U.S. Appl. No. 12/874,184, dated Feb. 10, 2012, 3 pages.
Advisory Action received for U.S. Appl. No. 14/482,979, dated Aug. 1, 2016, 3 pages.
Advisory Action received for U.S. Appl. No. 14/715,351, dated Jul. 5, 2018, 5 pages.
Advisory Action received for U.S. Appl. No. 15/158,461, dated Oct. 31, 2017, 2 pages.
Applicant Initiated Interview Summary received for U.S. Appl. No. 14/482,979, dated Jul. 21, 2016, 3 pages.
Corrected Notice of Allowance received for U.S. Appl. No. 14/056,841, dated Mar. 6, 2015, 7 pages.
Final Office Action received for U.S. Appl. No. 11/650,046, dated May 3, 2011, 10 pages.
Final Office Action received for U.S. Appl. No. 12/557,814, dated Nov. 6, 2013, 21 pages.
Final Office Action received for U.S. Appl. No. 14/715,351, dated Feb. 13, 2018, 29 pages.
Final Office Action received for U.S. Appl. No. 16/056,180, dated Jul. 11, 2019, 13 pages.
First Action Interview Office Action received for U.S. Appl. No. 14/715,351, dated Aug. 10, 2017, 7 pages.
International Search Report received for PCT Patent Application No. PCT/US2007/026177, dated Jun. 11, 2008, 3 pages.
International Search Report received for PCT Patent Application No. PCT/US2008/066759, dated Oct. 6, 2008, 2 pages.
Non-Final Office Action received for U.S. Appl. No. 11/818,454, dated May 10, 2010, 17 pages.
Non-Final Office Action received for U.S. Appl. No. 12/283,423, dated Jan. 18, 2013, 10 pages.
Non-Final Office Action received for U.S. Appl. No. 12/557,814, dated Apr. 2, 2013, 25 pages.
Non-Final Office Action received for U.S. Appl. No. 12/904,012, dated Mar. 7, 2011, 26 pages.
Non-Final Office Action received for U.S. Appl. No. 15/997,541, dated Nov. 6, 2019, 8 pages.
Non-Final Office Action received for U.S. Appl. No. 16/056,180, dated Oct. 18, 2018, 15 pages.
Notice of Allowance received for U.S. Appl. No. 11/818,454, dated Sep. 29, 2010, 7 pages.
Notice of Allowance received for U.S. Appl. No. 12/557,814, dated Jan. 21, 2015, 5 pages.
Notice of Allowance received for U.S. Appl. No. 12/904,012, dated Nov. 16, 2011, 9 pages.
Notice of Allowance received for U.S. Appl. No. 12/904,012, dated Sep. 22, 2011, 10 pages.
Notice of Allowance received for U.S. Appl. No. 14/715,351, dated Jul. 27, 2018, 5 pages.
Notice of Allowance received for U.S. Appl. No. 15/997,541, dated Apr. 15, 2020, 8 pages.
Pre-Interview First Office Action received for U.S. Appl. No. 14/715,351, dated Mar. 29, 2017, 6 pages.
Restriction Requirement received for U.S. Appl. No. 11/619,433, dated Apr. 12, 2010, 5 pages.
Restriction Requirement received for U.S. Appl. No. 12/208,329, dated Jul. 15, 2011, 5 pages.

(56) References Cited

OTHER PUBLICATIONS

Restriction Requirement received for U.S. Appl. No. 12/283,435, dated Dec. 21, 2011, 6 pages.
Restriction Requirement received for U.S. Appl. No. 14/056,841, dated Jan. 16, 2014, 5 pages.
Search Report received for GB Patent Application No. 0808783.5, dated Jun. 25, 2012, 1 page.

* cited by examiner

SIMULTANEOUS SENSING ARRANGEMENT

CROSS-REFERENCE TO RELATED APPLICATIONS

This application is a continuation of U.S. patent application Ser. No. 14/482,979, filed Sep. 10, 2014 and published on Dec. 25, 2014 as U.S. Publication No. 2014-0375612, which is a continuation of U.S. patent application Ser. No. 14/019,264, filed Sep. 5, 2013, now U.S. Pat. No. 8,928,617, issued Jan. 6, 2015, which is a continuation of U.S. patent application Ser. No. 12/874,184, filed Sep. 1, 2010, now U.S. Pat. No. 8,552,998, issued Oct. 8, 2013, which is a division of U.S. patent application Ser. No. 11/619,433, filed Jan. 3, 2007, now U.S. Pat. No. 7,812,827, issued Oct. 12, 2010, the entire disclosures of which are also incorporated herein by reference. The present application is also related to the following U.S. Patents and Patent Applications, each of which is hereby incorporated by reference in its entirety:

U.S. patent application Ser. No. 09/236,513, titled "Method and Apparatus for Integrating Manual Input," filed Jan. 25, 1999, now U.S. Pat. No. 6,323,846, issued Nov. 27, 2001;

U.S. patent application Ser. No. 10/840,862, titled "Multipoint Touchscreen," filed May 6, 2004, now U.S. Pat. No. 7,663,607, issued Feb. 16, 2010; and U.S. patent application Ser. No. 11/381,313, titled "Multipoint Touch Surface Controller," filed May 2, 2006, now U.S. Pat. No. 8,279,180, issued Oct. 2, 2012.

BACKGROUND

Recently, interest has developed in touch and/or proximity-based input systems for electronic devices and computer systems that are capable of recognizing multiple touch and/or hover events simultaneously. Many of these systems, for example those based on mutual capacitance or certain optical sensing arrangements, involve applying periodic stimulus waveforms to a plurality of sense points and detecting sense waveforms that can be related to the periodic stimulus waveform by the amount of touch and/or proximity present at the sense point. In some embodiments, these systems apply periodic stimulus waveforms to drive lines that are coupled to sense lines at the sense points. Typically, stimulus waveforms have been applied to these drive lines one at a time. Because devices typically include a plurality of these drive lines, each drive line has been driven sequentially.

SUMMARY

According to one embodiment of the invention, a method of deriving touch information from a touch sensitive surface is provided. The touch sensitive device can include a plurality of sensing points. Each sensing point can be located at or near a crossing of a drive line and a sense line. For example, the method can include simultaneously (or substantially simultaneously) stimulating a plurality of the drive lines with one or more unique drive signals. For example, the signals may have predetermined phase and/or frequency relationships. The method can further include sensing a sense signal on at least one of the sense lines. The sense signal can relate to the drive signals by touch or proximity of one or more objects to one or more sensing points located at or near the crossing of the plurality of drive lines and the at least one sense line. The method can also include, for example, deriving touch information from the sense signal. Touch may be derived from the sense signal by deriving a plurality of values from the sense signal, e.g., by integrating the sense signal over one or more time periods and deriving touch information from a mathematical combination of the plurality of values.

In another embodiment, the invention can relate to a multi-touch sensing device. The touch sensing device can include, for example, a touch sensitive surface with a plurality of sensing points located at a crossings of drive lines and sense lines. The touch sensing device can also include drive circuitry configured to simultaneously apply unique drive signals to a plurality of the drive lines. For example, the signals may have predetermined phase and/or frequency relationships. The touch sensing device can also include sense circuitry that is configured to detect a sense signal in at least one sense line and derive touch information from this sense signal for one or more of the sense points. Such a touch sensing device may be based, for example, on self or mutual capacitance.

In yet another embodiment, the invention can relate to an electronic device or computer system incorporating a touch sensing arrangement or implementing a touch sensing method, as discussed above. The electronic device can take a variety of forms, including, for example, a desktop computer, a tablet computer, a notebook computer, a handheld computer, a personal digital assistant, a media player, or a mobile telephone. Other form factors are also possible.

In still another embodiment, the present invention can relate to a method of deriving touch information from a touch sensitive surface. The method can include performing a coarse scan of a region of the touch sensitive surface to determine whether a touch is present within the first region. If a touch is present, fine scanning of the region may be performed to determine more exact data about the touch or touches that are present within the region. If a touch is not present, fine scanning any be omitted, and a coarse scan of another region may begin. By eliminating unnecessary fine scans, time and power savings can result.

BRIEF DESCRIPTION OF THE DRAWINGS

The aforementioned and other aspects of the invention may best be understood by reference to the following description taken in conjunction with the accompanying drawings in which:

FIG. 4 illustrates a process for operating a multi-touch sensing device in accordance with an embodiment of the present invention.

DETAILED DESCRIPTION

Figure 1:
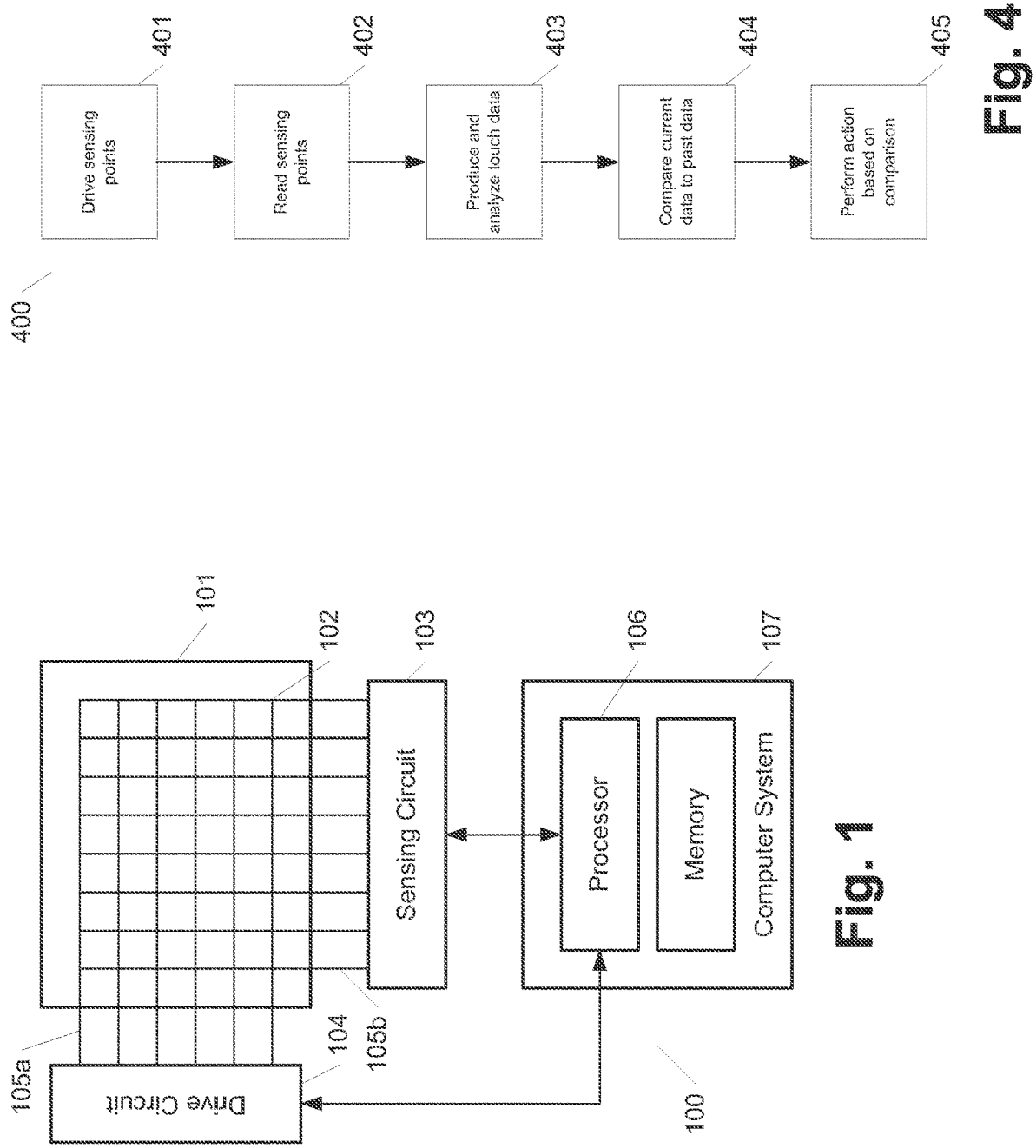
FIG. 1 illustrates a multi-touch sensing device used as an input device to a computer system in accordance with an embodiment of the present invention.

Recognizing multiple simultaneous or near-simultaneous touch events may be accomplished with a multi-touch sensing arrangement as illustrated in FIG. 1. Multi-touch sensing arrangement 100 can detect and monitor multiple touch attributes (including, for example, identification, position, velocity, size, shape, and magnitude) across touch sensitive surface 101, at the same time, nearly the same time, at different times, or over a period of time. Touch sensitive surface 101 can provide a plurality of sensor points, coordinates, or nodes 102 that function substantially independently of one another and that represent different points on a touch sensitive surface. Sensing points 102 may be positioned in a grid or a pixel array, with each sensing point capable of generating a signal at the same time. Sensing points 102 may be considered as mapping touch sensitive surface 101 into a coordinate system, for example, a Cartesian or polar coordinate system.

A touch sensitive surface may, for example, be in the form of a tablet or a touch screen. To produce a touch screen, the capacitance sensing points and other associated electrical structures can be formed with a substantially transparent conductive medium, such as indium tin oxide (ITO). The number and configuration of sensing points 102 may be varied. The number of sensing points 102 generally depends on the desired resolution and sensitivity. In touch-screen applications, the number of sensing points 102 may also depend on the desired transparency of the touch screen.

Figure 2:
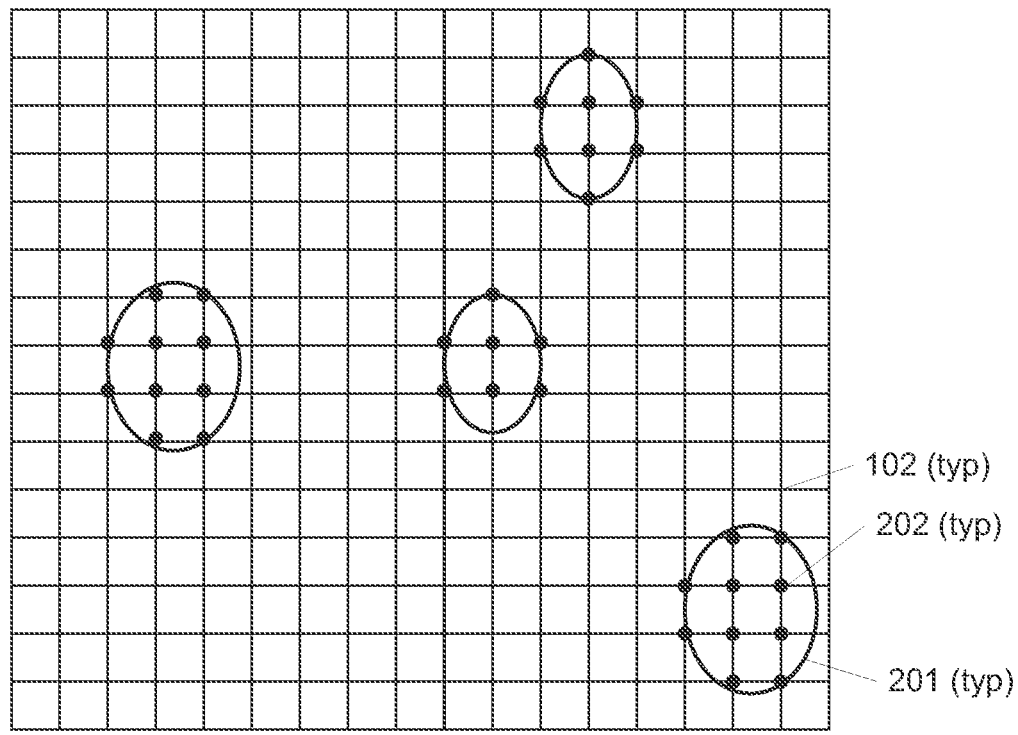
FIG. 2 illustrates a plurality of contact patch areas corresponding to an object in proximity to a plurality of sense points of a multi-touch surface in accordance with an embodiment of the present invention.

Using a multi-touch sensing arrangement, like that described in greater detail below, signals generated at nodes 102 of multi-touch sensor 101 may be used to produce an image of the touches at a particular point in time. For example, each object (e.g., finger, stylus, etc.) in contact with or in proximity to touch sensitive surface 101 can produce contact patch area 201, as illustrated in FIG. 2. Each of contact patch area 201 may cover several nodes 102. Covered nodes 202 may detect the object, while remaining nodes 102 do not. As a result, a pixilated image of the touch surface plane (which may be referred to as a touch image, a multi-touch image, or a proximity image) can be formed. The signals for each contact patch area 201 may be grouped together. Each contact patch area 201 may include high and low points based on the amount of touch at each point. The shape of contact patch area 201, as well as the high and low points within the image, may be used to differentiate contact patch areas 201 that are in close proximity to one another. Furthermore, the current image can be compared to previous images to determine how the objects may be moving over time, and what corresponding action should be performed in a host device as a result thereof.

Many different sensing technologies can be used in conjunction with these sensing arrangements, including resistive, capacitive, optical, etc. In capacitance-based sensing arrangements, as an object approaches touch-sensitive surface 101, a small capacitance forms between the object and sensing points 102 in proximity to the object. By detecting changes in capacitance at each of the sensing points 102 caused by this small capacitance, and by noting the position of the sensing points, a sensing circuit 103 can detect and monitor multiple touches. The capacitive sensing nodes may be based on self capacitance or mutual capacitance.

In self capacitance systems, the "self" capacitance of a sensing point is measured relative to some reference, e.g., ground. Sensing points 102 may be spatially separated electrodes. These electrodes are coupled to driving circuitry 104 and sensing circuitry 103 by conductive traces 105a (drive lines) and 105b (sense lines). In some self-capacitance embodiments, a single conductive trace to each electrode may be used as both a drive and sense line.

In mutual capacitance systems, the "mutual" capacitance between a first electrode and a second electrode can be measured. In mutual capacitance sensing arrangements, the sensing points may be formed by the crossings of patterned conductors forming spatially separated lines. For example, driving lines 105a may be formed on a first layer and sensing lines 105b may be formed on a second layer 105b such that the drive and sense lines cross or "intersect" one another at sensing points 102. The different layers may be different substrates, different sides of the same substrate, or the same side of a substrate with some dielectric separation. Because the drive and sense lines are separated, there is a capacitive coupling node at each "intersection."

The manner in which the drive and sense lines are arranged may vary. For example, in a Cartesian coordinate system (as illustrated), the drive lines may be formed as horizontal rows, while the sense lines may be formed as vertical columns (or vice versa), thus forming a plurality of nodes that may be considered as having distinct x and y coordinates. Alternatively, in a polar coordinate system, the sense lines may be a plurality of concentric circles with the drive lines being radially extending lines (or vice versa), thus forming a plurality of nodes that may be considered as having distinct r and angle coordinates. In either case, drive lines 105a may be connected to drive circuit 104, and sensing lines 105b may be connected to sensing circuit 103.

During operation, a drive signal (e.g., a periodic voltage) is applied to each drive line 105a. When driven, the charge impressed on drive line 105a can capacitively couple to the intersecting sense lines 105b through nodes 102. This can cause a detectable, measurable current and/or voltage in sense lines 105b. The relationship between the drive signal and the signal appearing on sense lines 105b is a function of the capacitance coupling the drive and sense lines, which, as noted above, may be affected by an object in proximity to node 102. Capacitance sensing circuit (or circuits) 103 may sense sensing lines 105b and may determine the capacitance at each node as described in greater detail below.

As discussed above, conventional drive lines 105a were driven one at a time, while the other drive lines were grounded. This process was repeated for each drive line 105a until all the drive lines had been driven, and a touch image (based on capacitance) was built from the sensed results. Once all the lines 105a had been driven, the sequence would repeat to build a series of touch images. However, in some embodiments of the present invention, multiple drive lines may be driven simultaneously or nearly simultaneously, as described, for example, below. As used herein, "simultaneously" encompasses precisely simultaneous as well as nearly simultaneous events. For example, simultaneous events may begin at about the same time, end at about the same time, and/or take place over at least partially overlapping time periods.

Figure 3:
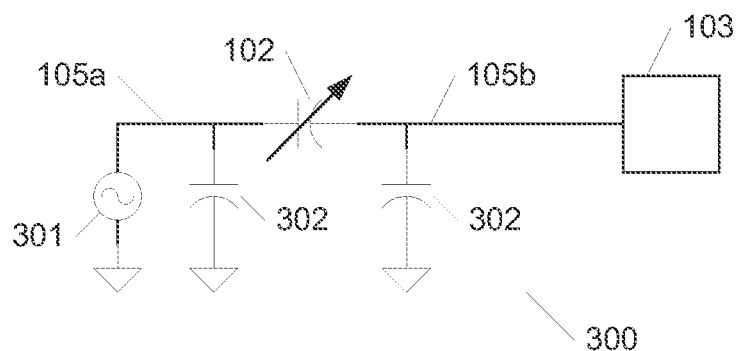
FIG. 3 illustrates a simplified schematic diagram of a mutual capacitance sensing circuit that may be used in an embodiment of the present invention.

FIG. 3 illustrates a simplified schematic diagram of mutual capacitance circuit 300 corresponding to the arrangement described above. Mutual capacitance circuit 300 may include drive line 105a and sense line 105b, which are spatially separated thereby forming capacitive coupling node 102. Drive line 105a may be electrically (i.e., conductively) coupled to drive circuit 104 represented by voltage source 301. Sense line 105b may be electrically coupled to capacitive sensing circuit 103. Both drive line 105a and sense line 105b may, in some cases, include some parasitic capacitance 302.

As noted above, in the absence of a conductive object proximate the intersection of drive line 105a and sense line 105b, the capacitive coupling at node 102 stays fairly constant. However, if an electrically conductive object (for example, a user's finger, stylus, etc.) comes in proximity to node 102, the capacitive coupling (i.e., the capacitance of the local system) changes. The change in capacitive coupling changes the current (and/or voltage) carried by sense line 105b. Capacitance sensing circuit 103 may note the capacitance change and the position of node 102 and report this information in some form to processor 106 (FIG. 1).

With reference to FIG. 1, sensing circuit 103 may acquire data from touch surface 101 and supply the acquired data to processor 106. In some embodiments, sensing circuit 103 may be configured to send raw data (e.g., an array of capacitance values corresponding to each sense point 102) to processor 106. In other embodiments, sensing circuit 103 may be configured to process the raw data itself and deliver processed touch data to processor 106. In either case, the processor may then use the data it receives to control operation of computer system 107 and/or one or more applications running thereon. Various implementations along these lines are described in the applications referenced above, and include a variety of computer systems having touch pads and touch screens.

In some embodiments, sensing circuit 103 may include one or more microcontrollers, each of which may monitor one or more sensing points 102. The microcontrollers may be application specific integrated circuits (ASICs), that work with firmware to monitor the signals from touch sensitive surface 101, process the monitored signals, and report this information to processor 106. The microcontrollers may also be digital signal processors (DSPs). In some embodiments, sensing circuit 103 may include one or more sensor ICs that measure the capacitance in each sensing line 105b and report measured values to processor 106 or to a host controller (not shown) in computer system 107. Any number of sensor ICs may be used. For example, a sensor IC may be used for all lines, or multiple sensor ICs may be used for a single line or group of lines.

FIG. 4 illustrates at a high level process 400 for operating a multi-touch sensing arrangement, like that described above. The process may begin at block 401 where plurality of sensing points 102 are driven. Following block 401, the process flow can proceed to block 402, where the outputs from sensing points 102 are read. For example, a capacitance value for each sensing point 102 can be obtained. Following block 402, the process can proceed to block 403 where an image or other form of data (signal or signals) of the touch at one moment in time can be produced and thereafter analyzed to determine where objects touching or in proximity to the touch sensor may be located. Following block 403, the process can proceed to block 404, where the current image or signal may be compared to one or more past images or signals to determine a change in one or more of the shape, size, location, direction, speed, acceleration, pressure, etc. for each object. This information can be subsequently used (in step 405) to perform an action in computer system 107, ranging from moving a pointer or cursor to complex gesture-based interactions.

Figure 5:
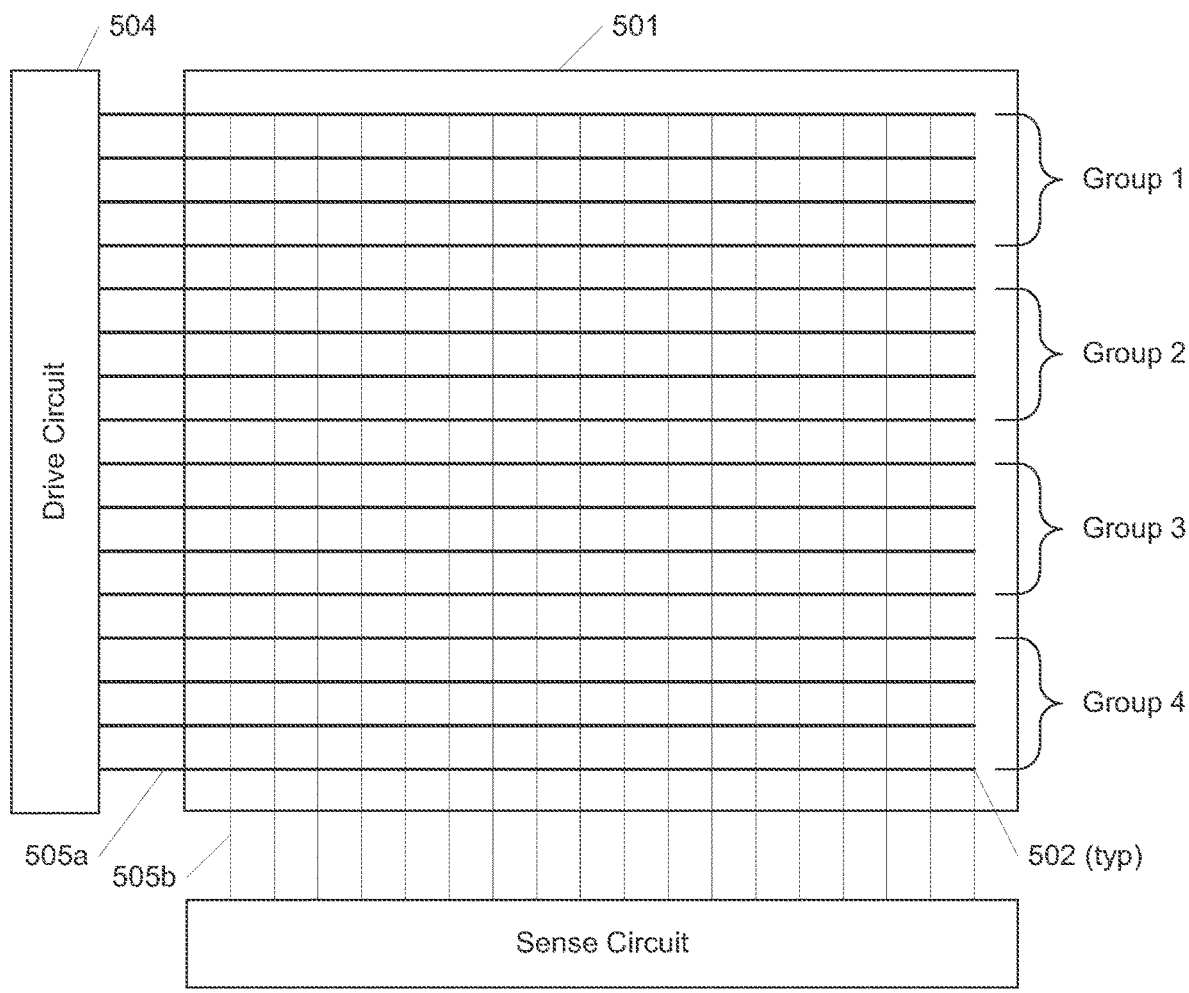
FIG. 5 illustrates a multi-touch sensing device in accordance with an embodiment of the present invention.

As noted above, enhanced operation of multi-touch sensing arrangements may be achieved by driving multiple rows simultaneously. An example multi-touch sensing device 500 with which multi-row stimulation may be employed is illustrated in FIG. 5 and has reference numerals generally corresponding to sensing arrangement 101 illustrated in FIG. 1. In the given example, touch sensitive surface 501 has sixteen drive rows 505a, although any number of drive rows could be used. The drive rows may be divided, for example, into four groups, e.g., Group 1, Group 2, Group 3, and Group 4, each including four drive rows 505a. Other numbers of groups and numbers of rows per group may also be employed.

Figure 7:
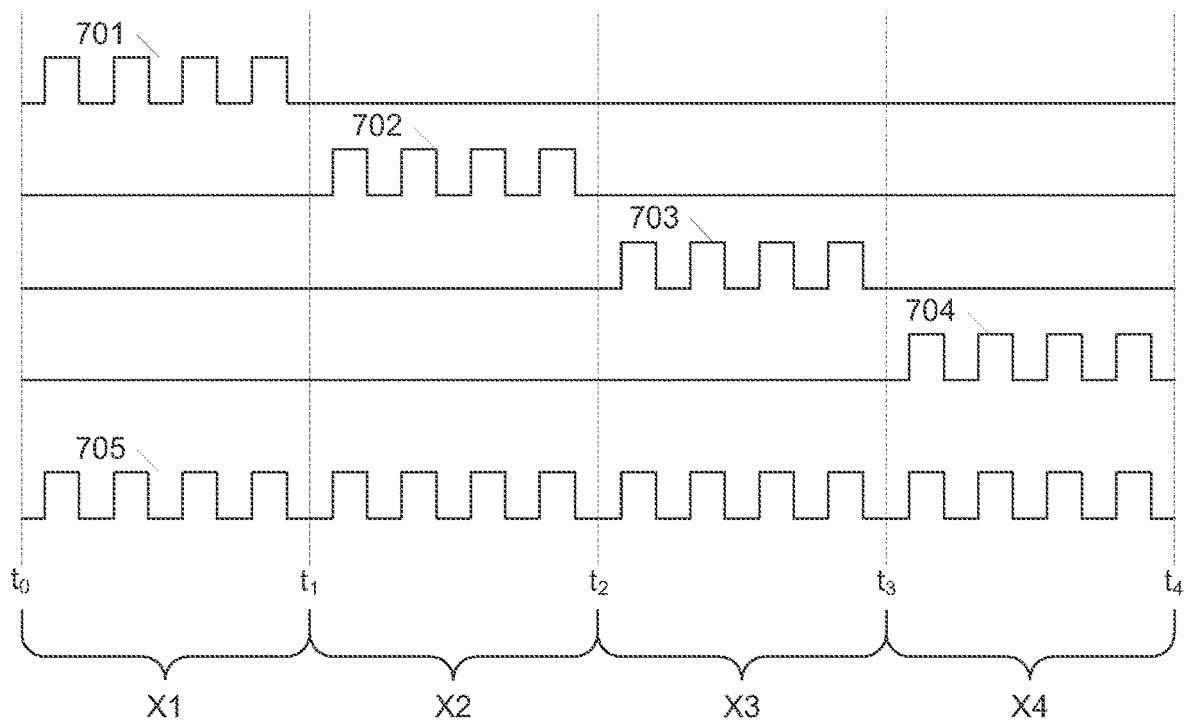
FIG. 7 illustrates a single-line stimulation arrangement according to the prior art.

Scanning of multi-touch sensor arrays is described in various references, including U.S. patent application Ser. No. 11/381,313, which is hereby incorporated by reference. The process may be briefly summarized by reference to FIG. 7. In general, a periodic waveform (e.g., a series of square wave pulses) is applied sequentially to drive rows 505a. For example, a first group of pulses 701 may be applied to Row A, followed by a second group of pulses 702 applied to row B, followed by a third group of pulses 703 applied to Row C, followed by a fourth group of pulses 704 applied to Row D. These periodic waveforms are capacitively coupled into sense lines 505b, generally resulting in sensed waveform 705 on each sense line. Sensed waveform 705 can be input integrated over a predetermined time period to measure the capacitive coupling between drive lines 505a and sense lines 505b at each node 502. Other processing, such as filtering, demodulation, etc., may also occur.

In sensed waveform 7051 the time period from to $t_0$ $t_1$ corresponds to the stimulus of Row A. Integrating the sensed waveform over this time period results in a numerical value X1, which can correspond to the capacitance of a node at the intersection of Row A and the column being sensed. Similarly, the time period from $t_1$ to $t_2$ corresponds to Row B, the time period from $t_2$ to $t_3$ corresponds to Row C, and the time period from $t_3$ to $t_4$ corresponds to Row D. Integrating the sensed waveform over each of these time periods can give numerical values X2, X3, and X4 corresponding to the capacitance of nodes at the intersection of the Rows B, C, and D and the column being sensed.

Figure 8:
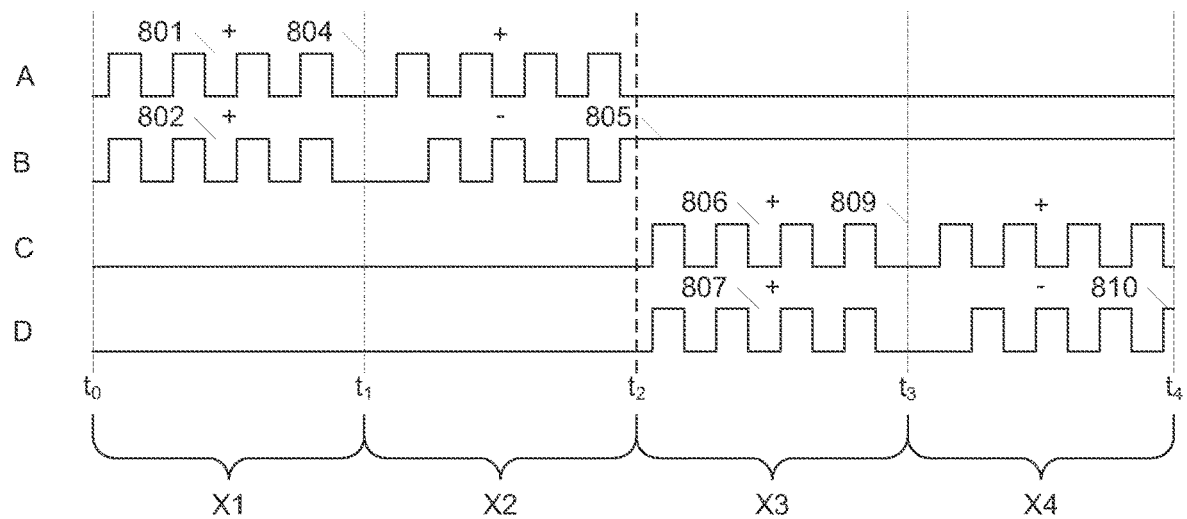
FIG. 8 illustrates a two-line simultaneous stimulation arrangement in accordance with an embodiment of the present invention.

FIG. 8 illustrates a multi-line stimulation arrangement in which two lines may be stimulated simultaneously. Specifically, Row A and Row B may be simultaneously (or nearly simultaneously) stimulated with waveforms 801 and 802. As can be seen, the phase of waveform 801 may be adjusted, e.g., after the fourth pulse. As a result, the remaining pulses of waveforms 801 and 802 may be 180° out of phase. Similarly, Row C and Row D may be simultaneously (or nearly simultaneously) stimulated with waveforms 806 and 807. Again, the phase of waveform 806 may be adjusted, e.g., after the fourth pulse. As a result, the remaining pulses of waveforms 806 and 807 may be 180° out of phase. The phase relationships between the waveforms may be easily understood with reference to the + and − signs above.

Unlike the example described above with reference to FIG. 7, the time periods $t_0$ to $t_1$, $t_1$ to $t_2$, $t_2$ to $t_3$, and $t_3$ to $t_4$ may no longer uniquely correspond to Rows A-D. Likewise, the measured values X1, X2, X3, and X4 resulting from integrating the sensed waveform (not shown) over these time periods no longer uniquely correspond to the capacitance of a node at the intersection of a particular row and the column being sensed. In the example of FIG. 8, time periods $t_0$ to $t_1$ and $t_1$ to $t_2$, along with their corresponding measured values X1 and X2, correspond together to both Row A and Row B. Similarly, time periods $t_2$ to $t_3$ and $t_3$ to $t_4$, along with their corresponding measured values X3 and X4, correspond together to both Row C and Row D. However, because of the phase difference between the stimulus waveforms 801 and 802, the effects of stimulating Row A only and Row B only can be isolated from each other. Similarly, because of the phase difference between the stimulus waveforms 806 and 807, the effects of stimulating Row C only and Row D only can be isolated from each other.

Specifically, because stimulus waveforms 801 and 802 are in phase over time period $t_0$ to $t_1$ and out of phase over time period $t_1$ to $t_2$ the integration result X1 plus the integration result X2 (i.e., X1+X2) can yield a value corresponding to the capacitance of a node at the intersection of Row A and the line being sensed, i.e., only the effect of the stimulus of Row A. Similarly, the integration result X1 minus the integration result X2 (i.e., X1−X2) can yield a value corresponding to the capacitance of a node at the intersection of Row B and the line being sensed, i.e., only the effect of the stimulus of Row B.

The same applies to Rows C and D. Because stimulus waveforms 806 and 807 are in phase over time period $t_2$ to $t_3$ and out of phase over time period $t_3$ to $t_4$, the integration result X3 plus the integration result X4 (i.e., X3+X4) can yield a value corresponding to the capacitance of a node at the intersection of Row C and the line being sensed, i.e., only the effect of the stimulus of Row C. Similarly, the integration result X3 minus the demodulation result X4 (i.e., X3−X4) can yield a value corresponding to the capacitance of a node at the intersection of Row D and the line being sensed, i.e., only the effect of the stimulus of Row D.

Figure 9:
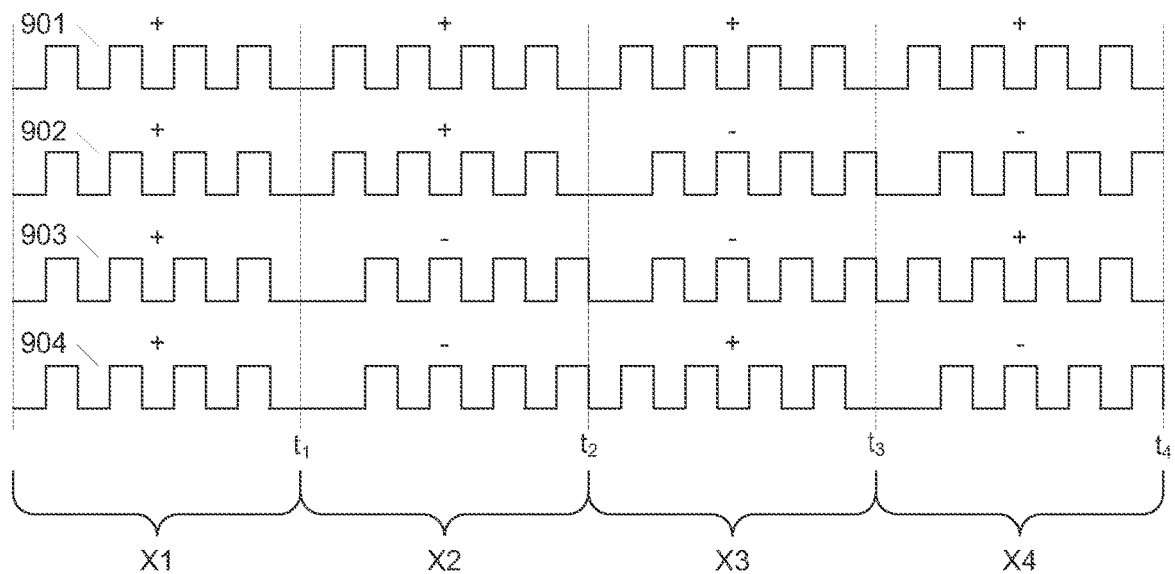
FIG. 9 illustrates a four-line simultaneous stimulation arrangement in accordance with an embodiment of the present invention.

FIG. 9 illustrates an exemplary multi-line stimulation arrangement in which four lines are stimulated simultaneously. During a first period from $t_0$ to $t_1$, the periodic waveforms 901-904 applied to Rows A-D are in phase. At time $t_1$, e.g., after the fourth pulse, the phase of waveforms 901 and 902 can be adjusted so that waveforms 901 and 902 are 180° out of phase with respect to waveforms 903 and 904. Similarly at time $t_2$, e.g., after the next four pulses, the phases of waveforms 901 and 903 are adjusted. This can result in waveforms 901 and 904 being 180° out of phase with respect to waveforms 902 and 903. Finally, at time $t_3$, e.g., after four more pulses, the phase of waveforms 901 and 902 can again be adjusted. This can result in waveforms 901 and 903 being 180° out of phase with respect to waveforms 902 and 904. The phase relationships between the various waveforms can be understood with reference to the + and − signs in the figure.

As in the preceding example, the phase relationships between waveforms 901-904 allow the effects of the stimulus on each individual row to be isolated as mathematical combinations of the measured integration results. Specifically, the effects of the stimulus of Row A can be determined by the expression X1+X2+X3+X4. The effects of the stimulus of Row B can be determined by summing X1+X2−X3−X4. The effects of the stimulus of Row C can be determined by X1−X2−X3+X4. The effects of the stimulus of row D can be determined by X1−X2+X3−X4.

Figure 6:
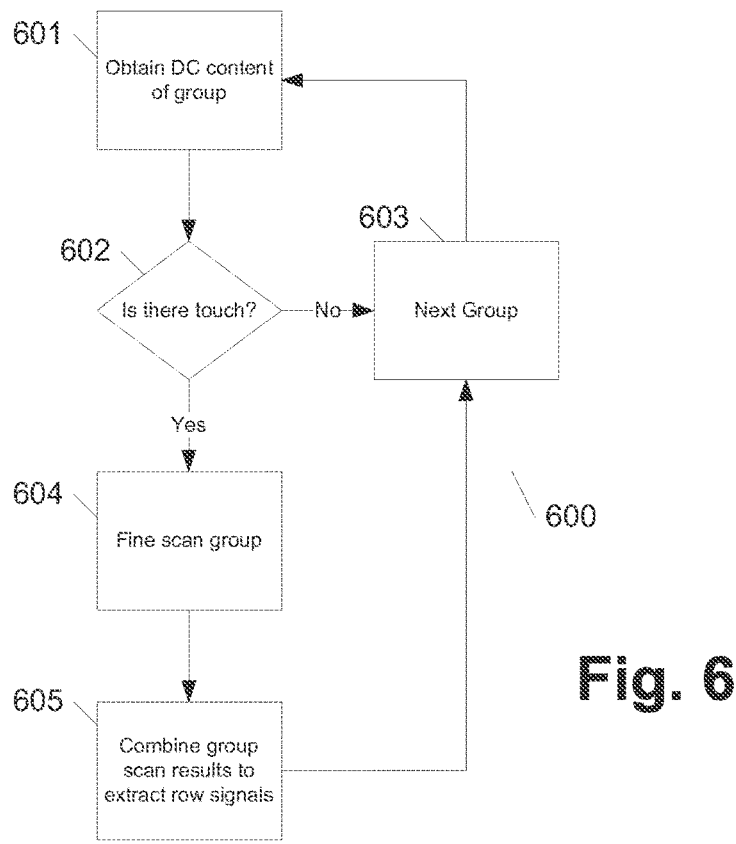
FIG. 6 illustrates a process for performing multi-line stimulation in accordance with an embodiment of the present invention.

The process of operation 600 of the multi-touch sensing arrangement 500 with multi-row stimulation may be further understood with reference to the flow chart of FIG. 6. First, the DC content for a group of rows can be obtained 601. In the example of FIG. 8, the DC content of the group of rows including Rows A and B can be obtained by integrating the sensed waveform over time period $t_0$ to $t_1$. This DC content can indicate (somewhat coarsely) whether there is any touch present within a given group, e.g., Rows A and B, corresponding to a particular region of touch surface 501. If at decision block 602, it is determined that there is no touch within a given group/region the next group (e.g., Rows C and D) can be similarly scanned. This may be implemented, for example, by implementing counter 603. If at decision block 602, it is determined that there is touch within a given group/region as indicated by the DC content of the group, a fine scan of the group is performed in block 604. The results of the fine scan may be combined to extract the signals corresponding to each row as described above. Once all groups have been scanned, the process repeats.

Turning back to FIGS. 5 and 6, each group of rows may be scanned according to the principles described in the foregoing paragraphs. A multi-touch sensing arrangement may comprise any number of rows and any number of groups. In some embodiments, a multi-touch sensing arrangement can employ multi-line stimulation on a single group, i.e., all lines of the device may be stimulated simultaneously or nearly simultaneously. Additionally, although described in terms of rows and columns, the drive and sense lines may be arranged in any geometric arrangement.

Multi-line stimulation as described above may provide a number of advantages. For example, when multiple rows are stimulated simultaneously, the stimulus voltage can be reduced. Specifically, the additive effect of multiple-row stimulus can result in the same sensed waveform amplitude for a lower "per row" stimulus voltage. For example, a single-line scanning arrangement using an 18Vpp (volts peak-to-peak) stimulus voltage could use a 9Vpp stimulus voltage with two lines being simultaneously stimulated or with a 4.5Vpp stimulus voltage with four lines being simultaneously stimulated, etc., to obtain similar sensed waveform amplitude.

Reducing the stimulus voltage can allow drive signals to be supplied directly from a driver chip without requiring a high voltage booster. The reduced voltage can also help to avoid fringe field and transistor breakdown issues. The reduced voltage can also result in reduced power consumption. Because power scales as square of voltage, cutting voltage by a factor of four (for four row simultaneous stimulation) cuts the power per row by a factor of 16. However, because there are four rows being driven, the actual power savings may only be a factor of 4. However, additional power may also be saved by not doing a fine-scan when there is no touch detected during a DC scan of the region, as described above.

A variation on the multi-row stimulation techniques described above may be referred to as differential multi-row stimulation. Differential multi-row stimulation may be understood with reference to the table below, which shows the polarities of the stimulating waveforms for the multi-row stimulation example of FIG. 9 above (Multi-Row Stimulation) compared to the polarities of the stimulating waveforms for a differential multi-row stimulation example (Differential Multi-Row Stimulation). Differential multi-row stimulation may generally correspond to the multi-row stimulation examples discussed above, except that the polarities of the stimulating waveforms may be rearranged as indicated below.

Stimulus Voltage Phase Comparison

| Row | X1 | X2 | X3 | X4 | Row Sum |
|---|---|---|---|---|---|
| Multi-Row Stimulation | | | | | |
| A | + | + | + | + | +4 |
| B | + | + | − | − | 0 |
| C | + | − | − | + | 0 |
| D | + | − | + | − | 0 |
| Col. Sum | +4 | 0 | 0 | 0 | |
| Differential Multi-Row Stimulation | | | | | |
| A | − | + | − | + | 0 |
| B | + | + | − | − | 0 |
| C | + | − | + | − | 0 |
| D | − | − | + | + | 0 |
| Col. Sum | 0 | 0 | 0 | 0 | |

As can be seen from the table, in the multi-row stimulation example, the net polarity applied across row A can have a DC component of four times the amplitude of the stimulus waveform. Similarly, the first time period (during which the value X1 may be measured) also can have a net DC component of four times the amplitude of the stimulus waveform. In the differential multi-row stimulation example, the polarities may be rearranged such that no row nor time period has a DC component. The absence of a DC component can result in a number of advantages, including allowing the charge sensing circuitry to operate with zero offset, automatic baseline removal, inherent centroids computation, and increased signal to noise ratio. In some embodiments, it may be desired to stimulate all rows of the sensor simultaneously (i.e., have only one group of rows) as differences in DC offset from one group to another may be lost because of an absence of DC content in the stimulus.

Figure 11:
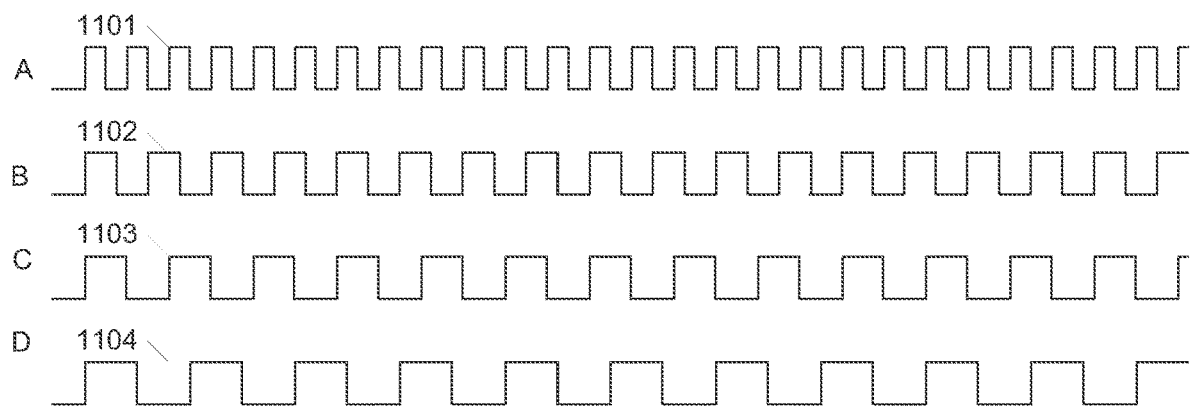
FIG. 11 illustrates a frequency-based four-line simultaneous stimulation arrangement in accordance with an embodiment of the present invention.

Other variations of the multi-row stimulation concept include phase or frequency-based multi-row stimulation. In the foregoing examples, different rows can be stimulated with waveforms having polarity (phase) differences so that effects of a given row may be isolated in the aggregate sense waveform. Another way to allow this type of isolation, illustrated in FIG. 11, is to stimulate each row of a group with a stimulus waveform having a different frequency. One or more demodulation circuits can then separate these frequencies in the sense waveform so that the contributions of each stimulated line may be isolated. In many embodiments demodulator circuits may already be present for noise filtering.

Examples of other possibilities for stimulus waveforms according to the principles described herein may be understood with reference to FIG. 12. Timing signal 1201 can define a stimulus time window. Each line can have a corresponding timing signal. During the stimulus time window, e.g., when signal 1201 is high, a stimulation waveform can be applied to the corresponding line (or lines). This stimulation waveform may take a variety of forms, including a square wave, a sine wave, an exponentially decaying sine wave, a pulsed sine wave, etc.

Figure 12A:
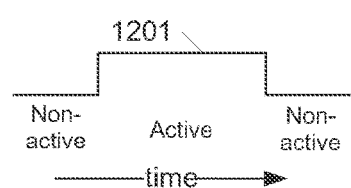
FIGS. 12A-E illustrate generally various alternatives for stimulus windows in accordance with an embodiment of the present invention.
Figure 12B:
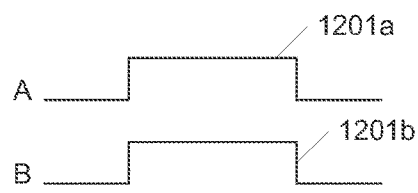
Figure 12C:
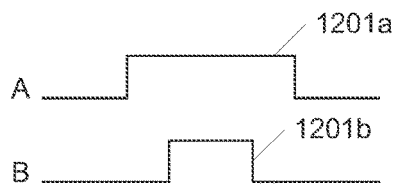
Figure 12D:
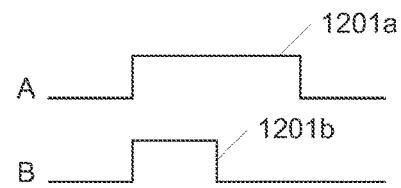
Figure 12E:
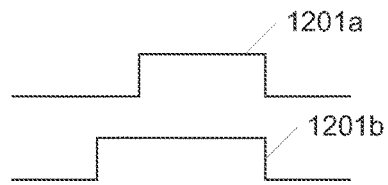

Simultaneous stimulation, as used herein, means that at least one stimulus is applied to at least two lines during the same time period (e.g., window, which can include one or more pulses of any shape and in any combination). In other words, simultaneous stimulation involves at least two lines having stimulus windows that at least partially overlap in time. For example, in FIG. 12B, a stimulus window for Row A, defined by timing signal 1201a can begin at the same time, extend for the same duration, and end at the same time as a stimulus window for Row B, defined by timing signal 1201b. Alternatively, as illustrated in FIG. 12C, the stimulus windows for Row A (defined by timing signal 1201a) and Row B (defined by timing signal 1201b) may begin and end at different times, but have at least some overlapping portion. Another alternative, illustrated in FIG. 12D, is for stimulus windows for Row A (defined by timing signal 1201 a) and Row B (defined by timing signal 1201b) may begin at the same time, but end at different times. Still another alternative, illustrated in FIG. 12E, is for stimulus windows for Row A (defined by timing signal 1201a) and Row B (defined by timing signal 1201b) to begin at different times but end at the same time. These various arrangements can also be extended to a number of rows greater than two, with complete flexibility so long as there is some stimulation overlap between at least some rows.

Figure 10:
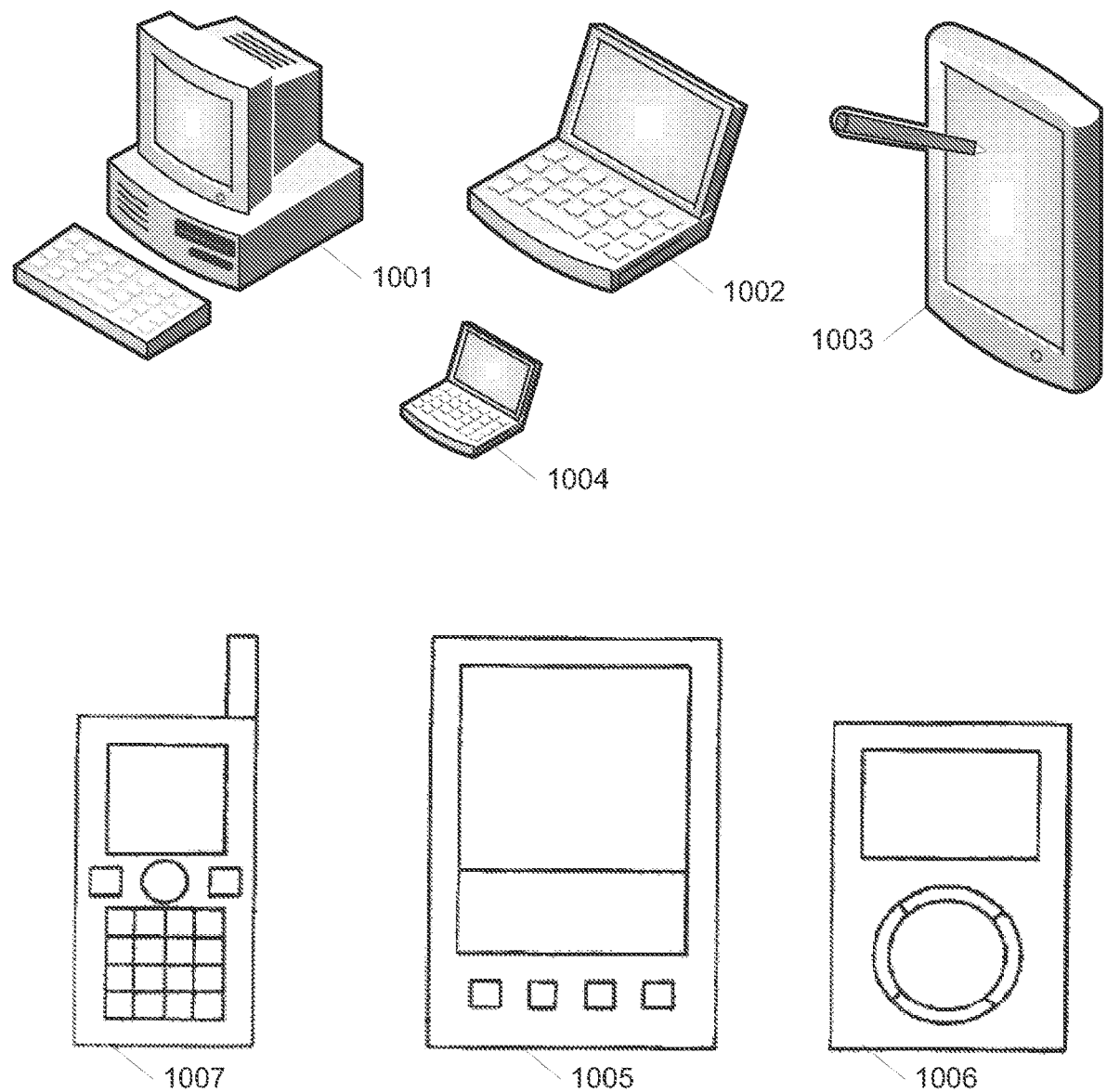
FIG. 10 illustrates a variety of electronic device and computer system form factors that may be used in accordance with an embodiment of the present invention.

The principles described herein may be used to devise input devices for a variety of electronic devices and computer systems. These electronic devices and computer system may be any of a variety of types illustrated in FIG. 10, including desktop computers 1001, notebook computers 1002, tablet computers 1003, handheld computers 1004, personal digital assistants 1005, media players 1006, mobile telephones 1007, and the like. Additionally, the electronic devices and computer systems may be combinations of these types, for example, a device that is a combination of a personal digital assistant, media player, and mobile telephone.

Other alternations, permutations, and combinations of the aforementioned embodiments are also possible. For example, multiple touch and proximity systems may be designed based on infrared/optical sensing arrangements that rely on periodic waveform stimulus and reflections from hand parts or other touch objects to detect touch and/or hover events. The principles herein, though described with reference to capacitive systems, are equally applicable to any systems in which touch or proximity sensing depends on information extracted from periodic stimulus waveforms. It is therefore intended that the following claims be interpreted as including all alterations, permutations, combinations and equivalents of the foregoing.

The invention claimed is:

1. A touch sensing device comprising:
   drive circuitry configured to:
      apply a first drive signal to a first drive line of a plurality of drive lines during a first stimulus window; and
      apply a second drive signal to a second drive line of the plurality of drive lines during a second stimulus window, the second stimulus window at least partially overlapping the first stimulus window during an overlapping stimulus window, wherein the first and second drive signals have a predetermined frequency relationship and are in phase during a first portion of the overlapping stimulus window and out of phase during a second portion of the overlapping stimulus window; and
   sense circuitry configured to:
      detect a sense signal from at least one sense line, the sense signal being related to the first and second drive signals by touch or proximity of one or more objects to one or more sensing points associated with the at least one sense line, a sensing point being associated with at least one of the plurality of drive lines and at least one of a plurality of sense lines; and derive touch information for the one or more sensing points from the sense signal.

2. The touch sensing device of claim 1, wherein the sense circuitry comprises at least one microcontroller.

3. The touch sensing device of claim 2, wherein the at least one microcontroller is an application specific integrated circuit (ASIC).

4. The touch sensing device of claim 2, wherein the at least one microcontroller is a digital signal processor (DSP).

5. The touch sensing device of claim 1, wherein the sense circuitry derives touch information from the sense signal by deriving a plurality of values from the sense signal and deriving touch information from a mathematical combination of the plurality of values.

6. The touch sensing device of claim 5, wherein the sense circuitry derives a plurality of values from the sense signal by integrating the sense signal over time.

7. The touch sensing device of claim 5, wherein the plurality of values correspond to a capacitance measurement at a plurality of sensing points.

8. The touch sensing device of claim 1, the drive circuitry further configured to:
apply a third drive signal to a third drive line of the plurality of drive lines during a third stimulus window; and
apply a fourth drive signal to a fourth drive line of the plurality of drive lines during a fourth stimulus window, the first, second, third and fourth stimulus windows at least partially overlapping during the overlapping stimulus window;
wherein the first, second, third and fourth drive signals have the predetermined frequency relationship and two of the first, second, third and fourth drive signals are out of phase with another two of the first, second, third and fourth drive signal during a third portion of the overlapping stimulus window.

9. The touch sensing device of claim 1, wherein a phase relationship between the first and second drive lines during the overlapping stimulus window is selected to eliminate a DC component of the sense signal.

10. The touch sensing device of claim 1, wherein the plurality of drive lines and the plurality of sense lines are part of a touch screen.

11. A method of stimulating a touch sensitive surface, the touch sensitive surface comprising a plurality of sensing points, a sensing point being associated with at least one of a plurality of drive lines and at least one of a plurality of sense lines, the method comprising:
stimulating a first drive line of the plurality of drive lines with a first drive signal during a first stimulus window; and
stimulating a second drive line of the plurality of drive lines with a second drive signal during a second stimulus window, the second stimulus window at least partially overlapping the first stimulus window during an overlapping stimulus window;
wherein the first and second drive signals have a predetermined frequency relationship and are in phase during a first portion of the overlapping stimulus window and out of phase during a second portion of the overlapping stimulus window.

12. The method of claim 11, the method further comprising:
sensing a sense signal on at least one sense line, wherein the sense signal is related to the first and second drive signals by touch or proximity of one or more objects to one or more sensing points associated with at least one of the first and second drive lines and the at least one sense line; and
deriving touch information from the sense signal;
wherein deriving touch information from the sense signal comprises:
deriving a plurality of values from the sense signal; and
deriving touch information from a mathematical combination of the plurality of values.

13. The method of claim 12, wherein deriving touch information from the sense signal comprises integrating the sense signal over time.

14. The method of claim 12, wherein the plurality of values from the sense signal include a capacitance measurement.

15. The method of claim 11, further comprising:
stimulating a third drive line of the plurality of drive lines with a third drive signal during a third stimulus window; and
stimulating a fourth drive line of the plurality of drive lines with a fourth drive signal during a fourth stimulus window, the first, second, third and fourth stimulus windows at least partially overlapping during the overlapping stimulus window;
wherein the first, second, third and fourth drive signals have the predetermined frequency relationship and two of the first, second, third and fourth drive signals are out of phase with another two of the first, second, third and fourth drive signals during a third portion of the overlapping stimulus window.

16. The method of claim 15, wherein the first, second, third and fourth drive signals are in phase during a fourth portion of the overlapping stimulus window.

17. The method of claim 11, wherein a predetermined phase relationship of the first and second drive signals is selected to eliminate a DC component of a sense signal.

* * * * *